US012433633B2

(12) United States Patent
Pigott et al.

(10) Patent No.: US 12,433,633 B2
(45) Date of Patent: Oct. 7, 2025

(54) INTRAVASCULAR CATHETER HAVING AN EXPANDABLE INCISING PORTION

(71) Applicant: VentureMed Group, Inc., Plymouth, MN (US)

(72) Inventors: John P. Pigott, Sylvania, OH (US); Jenny Zeroni, Plymouth, MN (US); Adam Tschida, Brooklyn Park, MN (US)

(73) Assignee: VentureMed Group, Inc., Plymouth, MN (US)

( * ) Notice: Subject to any disclaimer, the term of this patent is extended or adjusted under 35 U.S.C. 154(b) by 381 days.

(21) Appl. No.: 17/856,435

(22) Filed: Jul. 1, 2022

(65) Prior Publication Data
US 2022/0330970 A1    Oct. 20, 2022

Related U.S. Application Data

(62) Division of application No. 17/221,539, filed on Apr. 2, 2021, now Pat. No. 12,324,603.

(51) Int. Cl.
*A61B 17/3207* (2006.01)
*A61B 17/3209* (2006.01)
*A61B 17/00* (2006.01)

(52) U.S. Cl.
CPC .. *A61B 17/320725* (2013.01); *A61B 17/3209* (2013.01); *A61B 2017/00986* (2013.01); *A61B 17/32075* (2013.01)

(58) Field of Classification Search
CPC ........ A61B 17/320725; A61B 17/3209; A61B 17/32075; A61B 2017/00986; A61B 90/03; A61B 2090/0811
See application file for complete search history.

(56) References Cited

U.S. PATENT DOCUMENTS

| 2,655,154 A | 10/1953 | Richter |
| 3,557,794 A | 1/1971 | Van Patten |

(Continued)

FOREIGN PATENT DOCUMENTS

| EP | 0727194 A1 | 8/1996 |
| WO | 8102109 A1 | 8/1981 |

(Continued)

OTHER PUBLICATIONS

Cardiovascular Systems Inc., Diamondback 360 Coronary Orbital Atherectomy System, http://www.csi360.com/products/coronary-diamondback-360-coronary-orbital-atherectomy-system-crowns/, 2016.

(Continued)

*Primary Examiner* — Ashley L Fishback
*Assistant Examiner* — Chima U Igboko
(74) *Attorney, Agent, or Firm* — Standley Law Group LLP; Adam J. Smith; Jeffrey S. Standley

(57) ABSTRACT

An intravascular catheter device includes an expandable portion secured to a flexible catheter tube and configured for controllable movement between a first position where at least a portion of each of a plurality of struts is moved outward so as to extend beyond an outer surface of a sheath and a second position where the struts are compressed. A limiter for restricting expansion of the expandable portion is interposed between the expandable portion and a tip member located distal to the expandable portion. An incising element associated with one of the struts is configured to incise tissue located within a blood vessel when the expandable portion is placed in the first position and retracted axially along the blood vessel.

20 Claims, 9 Drawing Sheets

(56) References Cited

U.S. PATENT DOCUMENTS

| | | | |
|---|---|---|---|
| 3,704,711 | A | 12/1972 | Park |
| 4,273,128 | A | 6/1981 | Banning |
| 4,292,974 | A | 10/1981 | Fogarty et al. |
| 4,654,027 | A | 3/1987 | Dragan et al. |
| 5,030,201 | A | 7/1991 | Palestrant |
| 5,074,817 | A | 12/1991 | Song |
| 5,074,871 | A | 12/1991 | Groshong |
| 5,100,425 | A | 3/1992 | Fischell et al. |
| 5,154,724 | A | 10/1992 | Andrews |
| 5,156,610 | A | 10/1992 | Reger |
| 5,178,625 | A | 1/1993 | Groshong |
| 5,190,525 | A * | 3/1993 | Oswald ............... A61M 5/1408 604/83 |
| 5,211,651 | A | 5/1993 | Reger et al. |
| 5,224,945 | A | 7/1993 | Pannek, Jr. |
| 5,244,619 | A | 9/1993 | Burnham |
| 5,246,421 | A | 9/1993 | Saab |
| 5,250,060 | A | 10/1993 | Carbo et al. |
| 5,282,484 | A | 2/1994 | Reger |
| 5,312,427 | A | 5/1994 | Shturman |
| 5,318,576 | A | 6/1994 | Plassche, Jr. et al. |
| 5,376,100 | A | 12/1994 | Lefebvre |
| 5,514,093 | A | 5/1996 | Ellis et al. |
| 5,591,194 | A | 1/1997 | Berthiaume |
| 5,658,309 | A | 8/1997 | Berthiaume et al. |
| 5,665,098 | A | 9/1997 | Kelly et al. |
| 5,676,654 | A | 10/1997 | Ellis et al. |
| 5,697,944 | A | 12/1997 | Lary |
| 5,697,948 | A | 12/1997 | Marin et al. |
| 5,728,067 | A | 3/1998 | Enger |
| 5,728,123 | A | 3/1998 | Lemelson et al. |
| 5,733,296 | A | 3/1998 | Rogers et al. |
| 5,766,192 | A | 6/1998 | Zacca |
| 5,792,158 | A | 8/1998 | Lary |
| 5,800,450 | A | 9/1998 | Lary et al. |
| 5,836,868 | A | 11/1998 | Ressemann et al. |
| 5,876,448 | A | 3/1999 | Thompson et al. |
| 5,961,536 | A | 10/1999 | Mickley et al. |
| 5,968,064 | A | 10/1999 | Selmon et al. |
| 6,071,287 | A | 6/2000 | Verbeek |
| 6,120,515 | A | 9/2000 | Rogers et al. |
| 6,129,708 | A | 10/2000 | Enger |
| 6,165,187 | A | 12/2000 | Reger |
| 6,217,549 | B1 | 4/2001 | Selmon et al. |
| 6,258,108 | B1 | 7/2001 | Lary |
| 6,270,489 | B1 | 8/2001 | Wise et al. |
| 6,283,947 | B1 | 9/2001 | Mirzaee |
| 6,527,740 | B1 | 3/2003 | Jackson et al. |
| 6,599,267 | B1 | 7/2003 | Ray et al. |
| 6,692,466 | B1 | 2/2004 | Chow et al. |
| 6,695,863 | B1 | 2/2004 | Ramzipoor et al. |
| 6,719,773 | B1 | 4/2004 | Boucher et al. |
| 6,884,257 | B1 | 4/2005 | Cox |
| 7,108,704 | B2 | 9/2006 | Trerotola |
| 7,131,981 | B2 | 11/2006 | Appling et al. |
| 7,172,614 | B2 | 2/2007 | Boyle et al. |
| 7,279,002 | B2 | 10/2007 | Shaw et al. |
| 7,303,572 | B2 | 12/2007 | Melsheimer et al. |
| 7,329,267 | B2 | 2/2008 | Weber |
| 7,517,352 | B2 | 4/2009 | Evans et al. |
| 7,686,824 | B2 | 3/2010 | Konstantino et al. |
| 7,691,086 | B2 | 4/2010 | Tkebuchava |
| 7,708,753 | B2 | 5/2010 | Hardert |
| 7,850,685 | B2 | 12/2010 | Kunis et al. |
| 7,850,710 | B2 | 12/2010 | Huss |
| 7,887,557 | B2 | 2/2011 | Kelley et al. |
| 7,914,549 | B2 | 3/2011 | Morsi |
| 7,955,350 | B2 | 6/2011 | Konstantino et al. |
| 8,308,754 | B2 | 11/2012 | Belson |
| 8,323,307 | B2 | 12/2012 | Hardert |
| 8,328,829 | B2 | 12/2012 | Olson |
| 8,348,987 | B2 | 1/2013 | Eaton |
| 8,366,661 | B2 | 2/2013 | Weber et al. |
| 8,398,662 | B2 | 3/2013 | Granada et al. |
| 8,430,904 | B2 | 4/2013 | Belson |
| 8,454,636 | B2 | 6/2013 | Konstantino et al. |
| 8,500,789 | B2 | 8/2013 | Wuebbeling et al. |
| 8,613,721 | B2 | 12/2013 | Wulfman |
| 8,685,049 | B2 | 4/2014 | Schur et al. |
| 8,685,050 | B2 | 4/2014 | Schur et al. |
| 8,702,736 | B2 | 4/2014 | Schur et al. |
| 8,740,849 | B1 | 6/2014 | Fischell et al. |
| 8,870,816 | B2 | 10/2014 | Chambers et al. |
| 8,968,354 | B2 | 3/2015 | Wang et al. |
| 8,974,490 | B2 | 3/2015 | Jonsson |
| 9,039,727 | B2 | 5/2015 | Kusleika |
| 9,079,000 | B2 | 7/2015 | Hanson et al. |
| 9,192,747 | B2 | 11/2015 | Hardert |
| 9,282,991 | B2 | 3/2016 | Schur et al. |
| 9,314,329 | B2 | 4/2016 | Dickinson et al. |
| 9,364,255 | B2 | 6/2016 | Weber |
| 9,364,284 | B2 | 6/2016 | Groff et al. |
| 9,510,901 | B2 | 12/2016 | Steinke et al. |
| 9,532,798 | B2 | 1/2017 | Schur et al. |
| 9,545,263 | B2 | 1/2017 | Lenihan et al. |
| 9,592,386 | B2 | 3/2017 | Mathur et al. |
| 9,604,036 | B2 | 3/2017 | Burton et al. |
| 9,615,848 | B2 | 4/2017 | Pigott |
| 10,463,387 | B2 | 11/2019 | Pigott |
| 10,485,572 | B2 | 11/2019 | Pigott |
| 10,610,255 | B2 | 4/2020 | Pigott |
| 10,842,971 | B2 | 11/2020 | Iwano et al. |
| 10,874,837 | B2 | 12/2020 | Iwano et al. |
| 2001/0007059 | A1 | 7/2001 | Mirzaee |
| 2002/0010489 | A1 | 1/2002 | Grayzel et al. |
| 2002/0029052 | A1 | 3/2002 | Evans et al. |
| 2002/0143350 | A1 | 10/2002 | Heitzmann et al. |
| 2002/0143362 | A1 | 10/2002 | Macovial et al. |
| 2002/0161394 | A1 | 10/2002 | Macoviak et al. |
| 2003/0069547 | A1 | 4/2003 | Gonon |
| 2003/0125756 | A1 | 7/2003 | Shturman et al. |
| 2003/0144677 | A1 | 7/2003 | Lary |
| 2003/0208215 | A1 | 11/2003 | Uflacker |
| 2004/0034384 | A1 * | 2/2004 | Fukaya ............... A61M 25/104 606/191 |
| 2004/0098014 | A1 | 5/2004 | Flugelman |
| 2004/0122457 | A1 | 6/2004 | Weber |
| 2004/0204738 | A1 | 10/2004 | Weber et al. |
| 2004/0267345 | A1 | 12/2004 | Lorenzo et al. |
| 2005/0055077 | A1 | 3/2005 | Marco et al. |
| 2005/0149102 | A1 | 7/2005 | Radisch, Jr. et al. |
| 2005/0149159 | A1 | 7/2005 | Andreas et al. |
| 2005/0151304 | A1 | 7/2005 | Boelens et al. |
| 2005/0240176 | A1 | 10/2005 | Oral et al. |
| 2006/0020285 | A1 | 1/2006 | Niermann |
| 2006/0089637 | A1 | 4/2006 | Werneth et al. |
| 2006/0111736 | A1 | 5/2006 | Kelley |
| 2006/0116701 | A1 | 6/2006 | Crow |
| 2006/0184191 | A1 | 8/2006 | O'Brien |
| 2006/0253148 | A1 | 11/2006 | Leone et al. |
| 2007/0005093 | A1 | 1/2007 | Cox |
| 2007/0060863 | A1 | 3/2007 | Goeken et al. |
| 2007/0083194 | A1 | 4/2007 | Kunis et al. |
| 2007/0106215 | A1 | 5/2007 | Olsen et al. |
| 2007/0156225 | A1 | 7/2007 | George et al. |
| 2007/0181157 | A1 | 8/2007 | Dadourian |
| 2008/0140051 | A1 | 6/2008 | Bei et al. |
| 2008/0294116 | A1 | 11/2008 | Wolter et al. |
| 2008/0300594 | A1 | 12/2008 | Goto |
| 2008/0300610 | A1 | 12/2008 | Chambers |
| 2009/0099583 | A1 | 4/2009 | Butterfield et al. |
| 2009/0105686 | A1 | 4/2009 | Snow et al. |
| 2009/0192508 | A1 | 7/2009 | Laufer et al. |
| 2009/0204068 | A1 | 8/2009 | Nguyen et al. |
| 2009/0254172 | A1 | 10/2009 | Grewe |
| 2009/0306690 | A1 | 12/2009 | Rivers et al. |
| 2009/0312807 | A1 | 12/2009 | Boudreault et al. |
| 2010/0010521 | A1 | 1/2010 | Kurrus |
| 2010/0023035 | A1 | 1/2010 | Kontos |
| 2010/0076482 | A1 | 3/2010 | Shu et al. |
| 2010/0121270 | A1 | 5/2010 | Gunday et al. |
| 2010/0168737 | A1 | 7/2010 | Grunewald |
| 2010/0168778 | A1 | 7/2010 | Braido |
| 2010/0330147 | A1 | 12/2010 | Hossainy et al. |

(56) References Cited

U.S. PATENT DOCUMENTS

| | | |
|---|---|---|
| 2011/0060182 A1 | 3/2011 | Kassab et al. |
| 2011/0152683 A1 | 6/2011 | Gerrans et al. |
| 2011/0160645 A1 | 6/2011 | Sutermeister et al. |
| 2011/0184447 A1 | 7/2011 | Leibowitz et al. |
| 2011/0288479 A1 | 11/2011 | Burton |
| 2012/0053485 A1 | 3/2012 | Bloom |
| 2012/0143054 A1 | 6/2012 | Eaton et al. |
| 2012/0150142 A1 | 6/2012 | Weber et al. |
| 2012/0157988 A1 | 6/2012 | Stone et al. |
| 2012/0172901 A1 | 7/2012 | Manderfeld et al. |
| 2013/0066346 A1 | 3/2013 | Pigott |
| 2013/0116715 A1 | 5/2013 | Weber |
| 2013/0131594 A1 | 5/2013 | Bonnette et al. |
| 2013/0150874 A1 | 6/2013 | Kassab |
| 2013/0237950 A1 | 9/2013 | Gianotti et al. |
| 2013/0253467 A1 | 9/2013 | Gianotti et al. |
| 2014/0121672 A1 | 5/2014 | Folk |
| 2014/0257367 A1 | 9/2014 | Jonsson |
| 2014/0257368 A1 | 9/2014 | Jonsson |
| 2014/0277002 A1 | 9/2014 | Grace |
| 2014/0350523 A1 | 11/2014 | Dehdashtian et al. |
| 2014/0364896 A1 | 12/2014 | Consigny |
| 2014/0371783 A1 | 12/2014 | Shu et al. |
| 2015/0133978 A1 | 5/2015 | Paul, Jr. |
| 2015/0182324 A1 | 7/2015 | Naor et al. |
| 2016/0143721 A1 | 5/2016 | Rosenbluth et al. |
| 2017/0056048 A1 | 3/2017 | Erpen |
| 2017/0079679 A1* | 3/2017 | Pigott .............. A61M 25/0074 |
| 2017/0238960 A1 | 8/2017 | Hatta et al. |
| 2018/0177985 A1 | 6/2018 | Nakagawa et al. |
| 2019/0307992 A1* | 10/2019 | Haverkost ...... A61B 17/320725 |
| 2020/0289102 A1 | 9/2020 | Wilson et al. |
| 2020/0297376 A1 | 9/2020 | Marks et al. |
| 2021/0023347 A1 | 1/2021 | Iwano et al. |
| 2021/0220008 A1 | 7/2021 | Pigott |

FOREIGN PATENT DOCUMENTS

| | | |
|---|---|---|
| WO | 9502370 A2 | 1/1995 |
| WO | 1996039997 A2 | 12/1996 |
| WO | 9918862 A1 | 4/1999 |
| WO | 02078511 A2 | 10/2002 |
| WO | 02078511 A3 | 10/2002 |
| WO | 2007095125 A2 | 8/2007 |
| WO | 2013159066 A1 | 10/2013 |
| WO | 2013169596 A1 | 11/2013 |
| WO | 2014106226 A2 | 7/2014 |
| WO | 2014142801 A1 | 9/2014 |
| WO | 2015190578 A1 | 12/2015 |
| WO | 2015195606 A1 | 12/2015 |
| WO | 2016210167 A1 | 12/2016 |

OTHER PUBLICATIONS

Boston Scientific Corporation, FilterWire EZ, Embolic Protection System for Carotid Arteries, Sep. 2015, http://www.bostonscientific.com/en-US/products/embolic-protection/filterwire-ez-embolic-protection-system.html.

International Search Report, Application No. PCT/US2012/055079, dated Jan. 31, 2013.

Boston Scientific, Rotablator Rotational Atherectomy System, http://www.bostonscientific.com/en-US/products/plaque-modification/rotablator-rotational-atherectomy-system.html, 2017.

Covidien, SpiderFX Embolic Protection Device, 2015, https://www.ev3.net/peripheral/us/embolic-protection/spiderfxtrade-embolic-protection-device.htm.

Boston Scientific, Sterling 0.018" Balloon Catheter, Jun. 2015.

Ham, S. et al., Safety of Carbon Dioxide Digital Subtraction Angiography, Archives of Surgery, Dec. 2011.

Alexander, J., CO2 Angiography in Lower Extremity Arterial Disease, Endovascular Today, Sep. 2011, pp. 27-34.

* cited by examiner

INTRAVASCULAR CATHETER HAVING AN EXPANDABLE INCISING PORTION

CROSS-REFERENCE TO RELATED APPLICATIONS

This application is a divisional of application Ser. No. 17/221,539 filed Apr. 2, 2021, the disclosures of which are incorporated herein by reference.

BACKGROUND AND SUMMARY OF THE INVENTION

This invention relates in general to intravascular catheters, such as can be used during minimally invasive surgical procedures. In particular, this invention relates to an intravascular catheter having an expandable incising portion.

Atherosclerosis is a chronic condition in which atheromatous plaque accumulates on the inner walls of a blood vessel. As a result, the blood vessel walls can become inflamed and, over time, may harden to form atherosclerotic lesions that cause a narrowing of the vessel lumen. In severe cases, the atherosclerotic lesions can rupture and induce the formation of thrombus (i.e., blood clots), which can prevent blood flow through the narrowed vessel lumen.

There are known procedures and devices for treating or otherwise reducing the risks associated with atherosclerosis. For example, an angioplasty is a procedure in which a balloon catheter is inserted into a narrowed region of the vessel lumen via a delivery catheter. The balloon catheter includes a flexible tube having an inflatable balloon at an end thereof. Once positioned in the narrowed region, the balloon is inflated in order to dilate the narrowed vessel lumen. The pressure in the balloon is generally sufficient to compress the accumulated plaque. However, in some cases it would be desirable to fragment the atherosclerotic lesions. Thus, it would be desirable to provide an intravascular catheter having an expandable portion that can be selectively controlled by a user and adapted to create incisions in atherosclerotic material to facilitate fragmentation of the material during an angioplasty procedure.

This invention relates to an intravascular catheter device for use during a surgical procedure. The catheter device includes a catheter tube having an expandable portion with a plurality of struts each defining an outer surface. The expandable portion is operable between a closed position, wherein the expandable portion has a first diameter, and an opened position, wherein the expandable portion has a second diameter that is larger than the first diameter. An incising element is provided on the outer surface of at least one of the struts. The incising element has a sharpened edge that extends outwardly in a radial direction from the outer surface of the strut for creating an incision in atherosclerotic material located within a blood vessel when the expandable portion is in the opened position.

Various aspects of this invention will become apparent to those skilled in the art from the following detailed description of the preferred embodiments, when read in light of the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE PREFERRED EMBODIMENTS

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
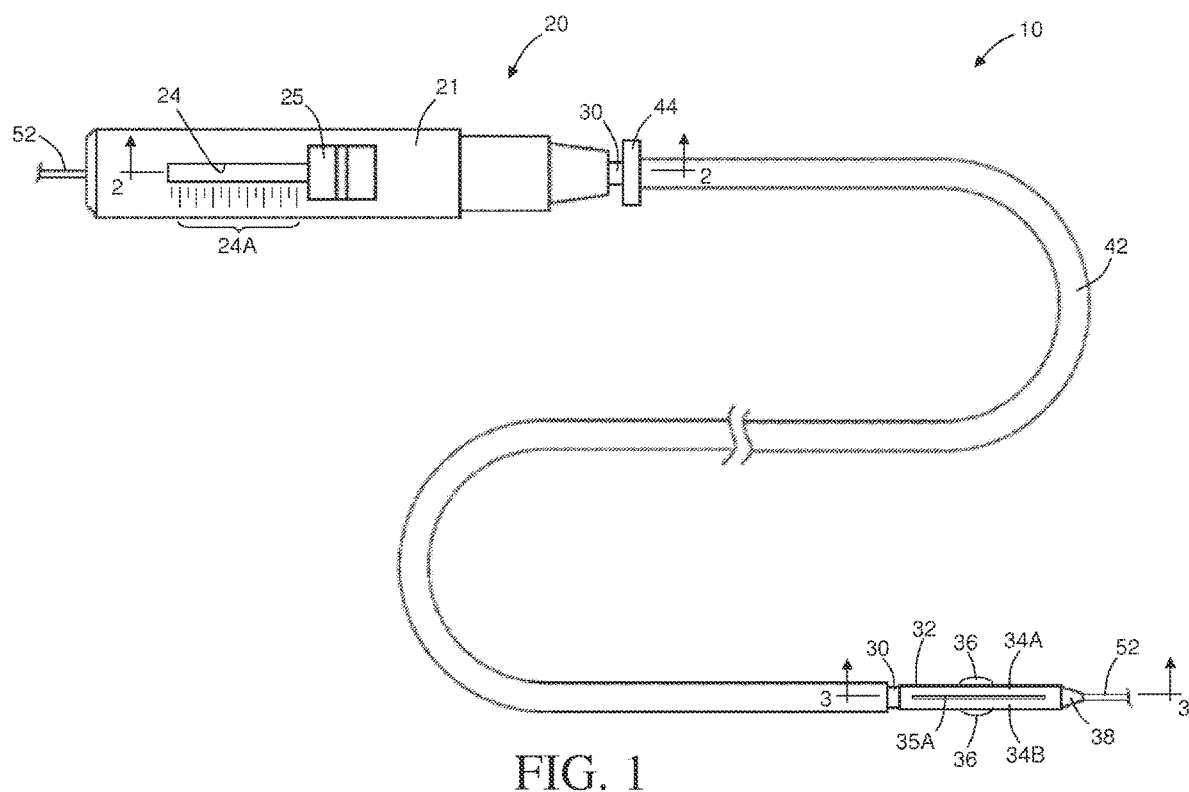
FIG. 1 is a plan view of a catheter device that includes a handle assembly and a catheter tube having an expandable incising portion, in accordance with a first embodiment of this invention.

Referring now to the drawings, there is illustrated in FIG. 1 a catheter device, indicated generally at 10, in accordance with this invention. The illustrated catheter device 10 is configured to treat or reduce the risks associated with atherosclerosis. In general, the catheter device 10 includes an expandable incising portion that can be inserted into a blood vessel and expanded to create incisions in atherosclerotic material that has accumulated on inner walls of the blood vessel. The incisions facilitate the fragmentation of the atherosclerotic material during a subsequent angioplasty or atherectomy procedure. Although the catheter device 10 will be described and illustrated in the context of treating atherosclerosis, it should be appreciated that the catheter device 10 can be used in any desired environment and for any desired purpose.

Figure 2:
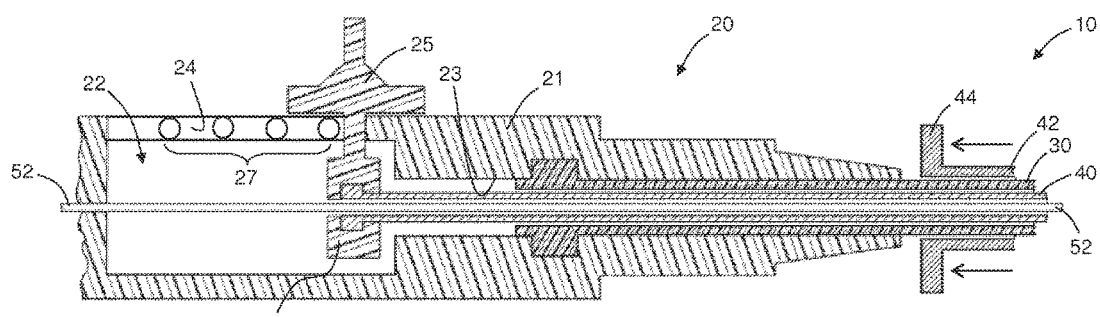
FIG. 2 is a cross-sectional side view of the handle assembly taken along section line 2-2 shown in FIG. 1 when the catheter device is in a first operating mode.

Referring now to FIGS. 1 and 2, the illustrated catheter device 10 includes a handle assembly, indicated generally at 20. The illustrated handle assembly 20 includes an elongated, cylindrical handle body 21. The handle body 21 may alternatively have any other shape that is suitable for easy handling by a surgeon. Further, the handle body 21 can be made from any suitably rigid material including, but not limited to, stainless steel or polymers.

As shown in FIG. 2, the illustrated handle body 21 defines an internal chamber 22. A passage 23 extends into an end portion of the handle body 21 for communication with the internal chamber 22. The handle body 21 further includes a slot 24 that extends through a side wall thereof for communication with the internal chamber 22. The illustrated slot 24 may have any length or width as desired. As shown in FIG. 1, an indicator 24A may be provided on the handle body 21 adjacent to the slot 24. For example, the indicator 24A can be a visual scale or any other indicating means, the purpose of which will be explained below.

The illustrated handle assembly 20 also includes a control member 25 that is supported on the handle body 21 for sliding movement within the slot 24. For example, the control member 25 is movable between a forward position (shown in FIG. 2), a rearward position (shown in FIG. 5), or any position therebetween, which will be further explained below. As shown in FIG. 2, the illustrated control member 25 includes a base portion 26 that is disposed within the internal chamber 22 of the handle body 21. The base portion 26 may define an outer cross-sectional shape that generally corresponds with a cross-sectional shape of the internal chamber 22, although such is not required. Alternatively (or in addition), the control member 25 may be movably supported on the handle body 21 by a bearing, a bushing, a guide rail, or any other structural means. In other embodiments, the control member 25 may be supported for rotational movement, pivotal movement, or any other type of movement relative to the handle body 21, the purpose of which will become apparent below. The visual indicator 24A, described above, is configured to identify the relative position of the control member 25 with respect to the handle body 21.

The illustrated handle assembly 20 also includes a locking mechanism 27 that is configured to temporarily secure the control member 25 in a desired position, although such is not required. As shown in FIG. 2, the illustrated locking mechanism 27 includes a plurality of protrusions that are spaced apart from one another along an inner surface of the slot 24. The control member 25 frictionally engages the protrusions to hold the control member 25 in the desired position. Alternatively, the locking mechanism 27 may be a threaded fastener, a pivotal latch, a push-button release, or any other mechanism that is configured to secure the control member 25 in a desired position.

Figure 3:
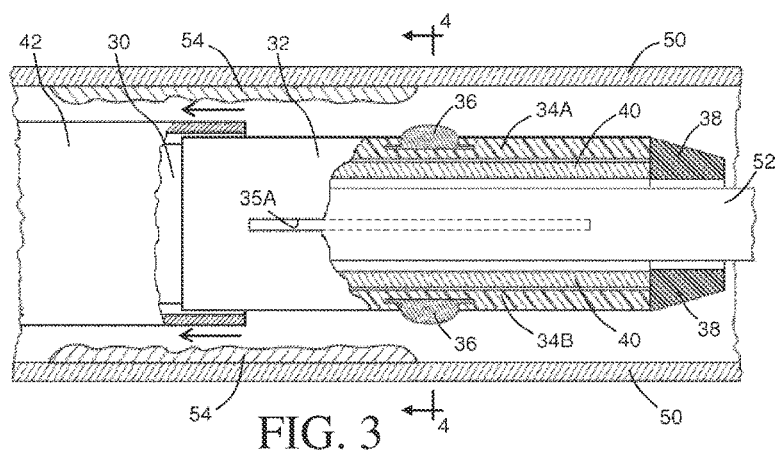
FIG. 3 is an enlarged cross-sectional side view of the catheter tube taken along section line 3-3 shown in FIG. 1 illustrating the expandable incising portion disposed within a blood vessel.

Referring now to FIGS. 1 through 3, the illustrated catheter device 10 also includes a catheter tube 30 that extends from the handle assembly 20. The catheter tube 30 is an elongated, flexible member having a proximal end that is secured to the handle assembly 20 and a distal end that extends therefrom. The catheter tube 30 can be made from any biocompatible material including, but not limited to, polyvinyl, polyethylene, nitinol, or stainless steel. Further, the catheter tube 30 can have any outer diameter, length, or wall thickness.

As shown in FIG. 2, the proximal end of the catheter tube 30 is secured to the handle body 21 and communicates with the internal cavity 22 through the passage 23. The catheter tube 30 may be secured to the handle body 21 using a flanged connection, a fused connection, an adhesive, a press-fit connection, a threaded connection, or any other securing means. Alternatively, the catheter tube 30 may be secured to the handle body 21 using a connector or any other type of attachment device.

As shown in FIGS. 1 and 3, an expandable portion 32 is provided on the distal end of the catheter tube 30. The illustrated expandable portion 32 is a cylindrical member having a longitudinal axis. The expandable portion 32 can be made from a generally resilient material that is able to flex between various positions, such as polyvinyl, polyethylene, nitinol, or stainless steel. The expandable portion 32 can be secured to the catheter tube 30 in any manner including, but not limited to, a fused connection, an adhesive, a press-fit connection, a threaded connection, or any other securing means. Alternatively, the expandable portion 32 can be integrally formed from the catheter tube 30. Further, the expandable portion 32 can have any outer diameter, length, or wall thickness.

Figure 4:
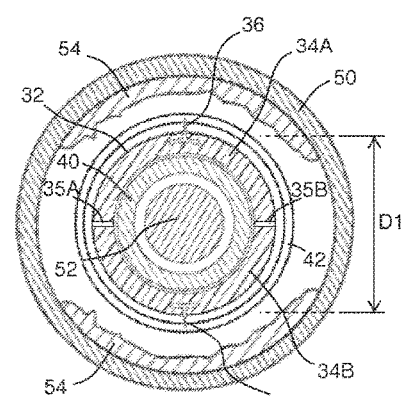
FIG. 4 is a cross-sectional end view of the expandable incising portion taken along section line 4-4 shown in FIG. 3.

The illustrated expandable portion 32 has a pair of struts 34A and 34B. The illustrated struts 34A and 34B are separated by a pair of longitudinally extending slits 35A and 35B that extend through side walls of the expandable portion 32. As shown in FIG. 4, the slits 35A and 35B are equally spaced apart from one another around the circumference of the expandable portion 32 such that the struts 34A and 34B have the same circumferential widths, although such is not required. The struts 34A and 34B may have any length, circumferential width, or cross-sectional shape as desired.

As shown in FIGS. 3 and 4, the illustrated expandable portion 32 also includes a pair of incising elements 36 that are respectively provided along outer surfaces of the struts 34A and 34B. The incising elements 36 can be atherotomes or other incising members having arcuate shaped sharpened edges, for example, that are configured to create incisions in atherosclerotic material as will be explained below. The illustrated incising elements 36 extend parallel with the longitudinal axis of the expandable portion 32 and outwardly in a radial direction therefrom. The incising elements 36 are equally spaced apart from one another around the circumference of the expandable portion 32. The expandable portion 32 may, however, have any number or configuration of incising elements 36 provided around the circumference thereof. Further, the incising elements 36 can have any cross-sectional shape, longitudinal length, or height and can be made from any suitable material including, but not limited to, tempered steel, stainless steel, high carbon steel, or ceramics. The incising elements 36 can be molded with the struts 34A and 34B or may otherwise be secured thereto in any manner such as, for example, using a welded or soldered connection, an adhesive, or any other fastening means.

The distal end of the expandable portion 32 may optionally include a tip member 38. The illustrated tip member 38 has a generally conical shape that facilitates insertion of the catheter tube 30 within a blood vessel 50 (see FIGS. 3 and 4) and subsequent travel therethrough. The tip member 38 may, however, have any desired shape. An aperture may axially extend through the tip member 38, the purpose of which will be explained below. The tip member 38 can be integrally formed with the expandable portion 32 or may be secured thereto, such as with an adhesive or the like. Further, the tip member 38 can be made from any biocompatible material including, but not limited to, polyvinyl, polyethylene, nitinol, stainless steel, or polyether block amide.

As shown in FIGS. 2 through 4, the illustrated catheter device 10 also includes an inner sleeve 40, although such is not required. The inner sleeve 40 is a flexible, tubular member that is supported for sliding movement within the catheter tube 30, the purpose of which will be explained below. The inner sleeve 40 can be made from any biocompatible material including, but not limited to, polyvinyl, polyethylene, nitinol, stainless steel, or a woven material. Further, the inner sleeve 40 can have any outer diameter, length, or wall thickness. The inner sleeve 40 need not be a tubular member but may alternatively be a solid wire, a braided wire, or the like.

As shown in FIG. 2, a proximal end of the inner sleeve 40 extends from the catheter tube 30 and into the internal chamber 22 of the handle body 21. The proximal end of the inner sleeve 40 is secured to the base portion 26 of the control member 25 for sliding movement therewith, the purpose of which will be explained below. The inner sleeve 40 can be secured to the base portion 26 by a flanged connection, a fused connection, an adhesive, a threaded connection, or any other securing means.

As shown in FIG. 3, the inner sleeve 40 extends through an entire length of the catheter tube 30. A distal end of the inner sleeve 40 that is opposite the handle assembly 20 is secured to the tip member 38, which is in turn secured to the expandable portion 32. The inner sleeve 40 may be secured to the tip member 38 in any manner including, but not limited to, a fused connection, an adhesive, a fastener, or the like.

Referring back to FIGS. 1 and 2, the illustrated catheter device 10 also includes a protective sheath 42 that is supported for sliding movement along an outer surface of the catheter tube 30, although such is not required. The protective sheath 42 can be made from any biocompatible material including, but not limited to, polyvinyl, polyethylene, nitinol, or stainless steel. Further, the protective sheath 42 can have any outer diameter, length, or wall thickness. The purpose of the protective sheath 42 will be explained below.

The illustrated protective sheath 42 includes a flange 44 that facilitates sliding movement of the protective sheath 42 relative to the catheter tube 30. The illustrated flange 44 is an annular member that is located at an end of the protective sheath 42 nearest the handle assembly 20. The flange 44 can be integrally formed with the protective sheath 42 or may otherwise be secured thereto in any manner, such as with an adhesive or the like. It should be appreciated that the flange 44 can have any shape or may alternatively be configured in any manner to accomplish the functions described herein and below.

The operation of the catheter device 10 will now be described with reference to FIGS. 1 through 7. Referring initially to FIGS. 1 through 4, the catheter device 10 is illustrated in a first operating mode. In the first operating mode, the control member 25 on the handle assembly 20 is located in the forward position relative to the handle body 21. The inner sleeve 40 fully extends into the catheter tube 30 such that the expandable portion 32 is in a closed position, as shown in FIGS. 3 and 4. In the closed position, the struts 34A and 34B are generally parallel with one another and with the inner sleeve 40. The slits 35A and 35B (illustrated by the dashed lines in FIG. 3) remain in a generally closed configuration. As such, the expandable portion 32 defines an initial diameter D1, which is generally the same diameter as the remaining length of the catheter tube 30. The initial diameter D1 of the expandable portion 32 may, however, be any desired dimension.

When the catheter device 10 is in the first operating mode, the distal end of the catheter tube 30 can be percutaneously inserted into a blood vessel 50, as shown in FIGS. 3 and 4. The illustrated catheter tube 30 is then advanced through the blood vessel 50 along a guide wire 52, which extends through the catheter device 10. For example, the guide wire 52 may fully extend through the inner sleeve 40, into the internal chamber 22 of the handle body 21, and exit a rear end of the handle assembly 20 (see FIG. 2). The catheter tube 30 is advanced along the guide wire 52 until the expandable portion 32 is positioned in a narrowed region of the blood vessel 50 caused by atherosclerotic material 54. Alternatively, the catheter tube 30 can be inserted into the blood vessel 50 and guided therethrough by a delivery catheter (not shown) or any other suitable procedure. During insertion and advancement of the catheter tube 30 through the blood vessel 50, the optional protective sheath 42 is preferably positioned over the expandable portion 32, thereby preventing the incising elements 36 from coming into contact with inner walls of the blood vessel 50.

Once the expandable portion 32 is positioned in the narrowed region of the blood vessel 50, the incising elements 36 can be exposed by sliding the protective sheath 42 back from the distal end of the catheter tube 30, as indicated by the direction arrows in FIG. 3. The illustrated protective sheath 42 can be moved in this manner by pulling the flange 44 towards the handle assembly 20, which is indicated by the direction arrows in FIG. 2.

Figure 5:
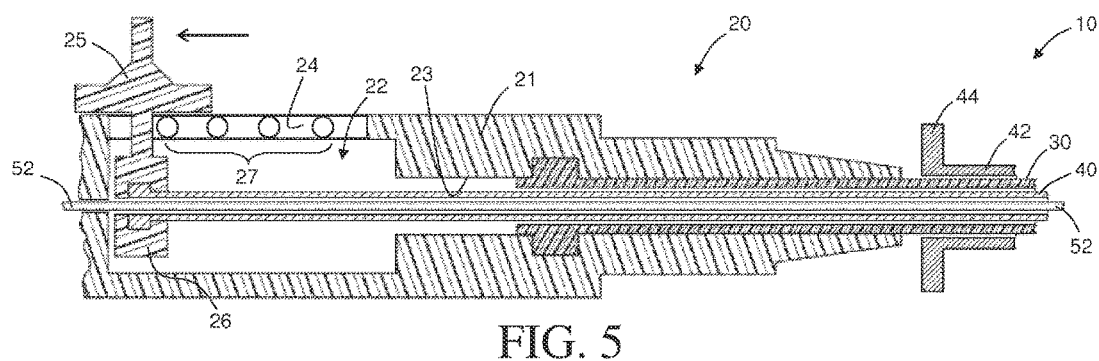
FIG. 5 is a cross-sectional side view of the handle assembly taken along section line 2-2 shown in FIG. 1 when the catheter device is in a second operating mode.
Figures 6, 7:
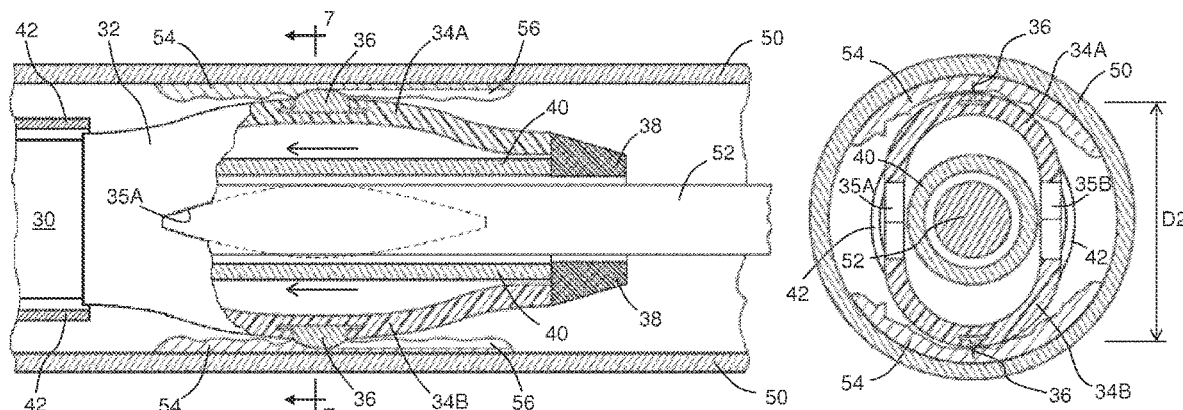
FIG. 6 is an enlarged cross-sectional side view of the catheter tube taken along section line 3-3 shown in FIG. 1 illustrating the expandable incising portion in an opened position.
FIG. 7 is a cross-sectional end view of the expandable incising portion taken along section line 7-7 shown in FIG. 6.

Referring now to FIGS. 5 through 7, the catheter device 10 is illustrated in a second operating mode. To achieve the second operating mode, the control member 25 is moved from the forward position to the rearward position, as indicated by the direction arrow in FIG. 5. As the control member 25 is moved to the rearward position, the inner sleeve 40 is drawn within the catheter tube 30 thereby reducing the relative length of the inner sleeve 40 with respect to the catheter tube 30. The distal end of the inner sleeve 40 is attached to the tip member 38, as described above, causing the expandable portion 32 to become axially compressed between the tip member 38 and the distal end of the catheter tube 30. As a result, the struts 34A and 34B bow or expand outwardly in a generally arcuate fashion thereby defining an opened position. In the opened position, the expandable portion 32 defines a second diameter D2 that is larger than the initial diameter D1 when the expandable portion 32 is in the closed position. As shown in FIG. 6, the incising elements 36 are respectively positioned along the radially outer most surfaces of the struts 34A and 34B. Further, the outer most surfaces of the struts 34A and 34B may define a generally flat portion along a length thereof in the opened position, the purpose of which will be explained below, although such is not required. It should be appreciated that the struts 34A and 34B can have any lengths such that the expandable portion 32 can achieve a desired overall second diameter D2 in the opened position.

During operation of the catheter device 10, the second diameter D2 can be increased or decreased by selective movement of the control member 25 between the forward and rearward positions. For example, a larger second diameter D2 can be achieved by moving the control member 25 further towards the rearward position. Conversely, a smaller second diameter D2 can be achieved by moving the control member 25 further towards the forward position. The visual indicator 24A can be used to identify the instantaneous second diameter D2 of the expandable portion 32. Alternatively (or in addition), the struts 34A and 34B may be biased in the opened position so as to automatically expand outwardly to the second diameter D2 when the protective sheath 42 is slid back from the expandable portion 32. As such, sliding movement of the protective sheath 42 relative to the struts 34A and 34B can be used to selectively control the second diameter D2. In this configuration, the inner sleeve 40 and the movable components of the handle assembly 20 may not be necessary.

When the catheter device 10 is in the second operating mode, the expandable portion 32 can be pulled along the guide wire 52 through the narrowed region of the blood vessel 50. This can be accomplished by pulling on the handle assembly 20. In doing so, the incising elements 36 engage the atherosclerotic material 54 and create longitudinal incisions 56 therein. As shown in FIGS. 6 and 7, the outer surface area of the arcuate shaped struts 34A and 34B, which is adjacent to the incising element 36, is configured to ride along a surface of the atherosclerotic material 54, thereby limiting the depth of the incisions 56 and preventing the incising members 36 from cutting the walls of the blood vessel 50. The expandable portion 32 can be moved any distance along the guide wire 52 to create incisions 56 having any desired length. After the incisions 56 are made in the atherosclerotic material 54, the catheter device 10 can be returned to the first operating mode (shown in FIGS. 1 through 4) by moving the control member 25 to the forward position. In doing so, the expandable portion 32 returns to the closed position. The protective sheath 42 can be slid over the expandable portion 32 and the catheter tube 30 may be removed from the blood vessel 50.

Alternatively, the catheter device 10 can be used to create additional incisions 56 in the atherosclerotic material 54. For example, after the catheter device 10 has been returned to the first operating mode, the expandable portion 32 can be relocated within the narrowed region of the blood vessel 50. The catheter tube 30 can then be rotated within the blood vessel 50 by rotating the handle assembly 20 so as to align the incising elements 36 with other portions of the atherosclerotic material 54. The previous steps can then be repeated any number of times to make multiple passes through the narrowed region of the blood vessel 50 and create additional incisions in the atherosclerotic material 54.

Thus, it should be appreciated that the illustrated catheter device 10 is advantageous in many respects. In one example, the second diameter D2 of the expandable portion 32 can be selectively controlled by operation of the handle assembly 20 or by sliding movement of the protective sheath 42. This enables the catheter device 10 to be adapted for use in blood vessels 50 of different sizes or varying diameters. In another example, the illustrated catheter device 10 can apply varying magnitudes of radial forces to the atherosclerotic material 54 by controlling the amount of force being applied to the control member 25 on the handle assembly 20. This enables the catheter device 10 to generate sufficient radial force to create incisions 56 in atherosclerotic material 54 while reducing the potential for tearing the walls of the blood vessel 50. In yet another example, the catheter device 10 can be used to make any number of passes during a single procedure to make multiple incisions 56 in atherosclerotic material 54 of varying lengths and shapes.

Figure 8:
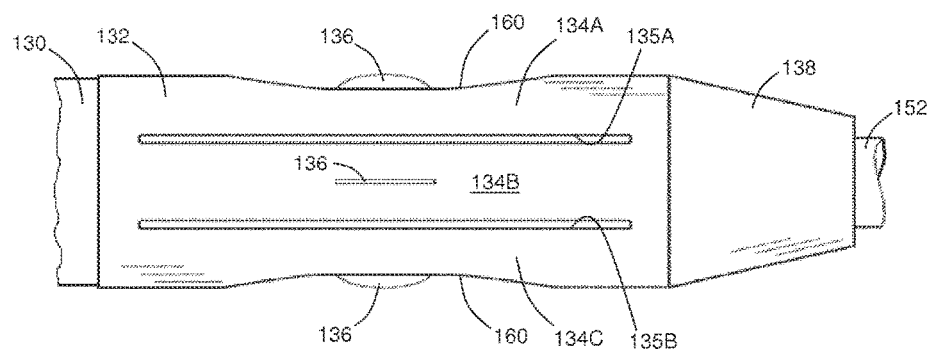
FIG. 8 is an enlarged side view of a catheter tube having an expandable incising portion, in accordance with a second embodiment of this invention.
Figure 9:
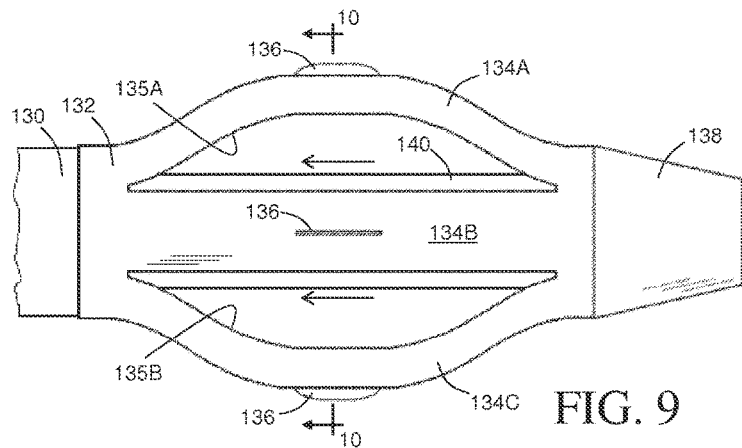
FIG. 9 is a side view of the catheter tube shown in FIG. 8 illustrating the expandable incising portion in an opened position.
Figure 10:
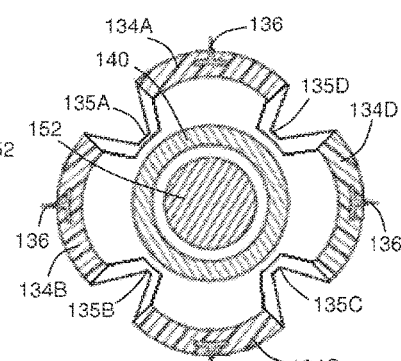
FIG. 10 is a cross-sectional end view of the expandable incising portion taken along section line 10-10 shown in FIG. 9.

Referring now to FIGS. 8 through 10, there is illustrated a catheter tube 130 having an expandable portion 132, in accordance with a second embodiment of this invention. The catheter tube 130 and the expandable portion 132 may include any structural features as described and illustrated above in the previous embodiment, although such is not required. Similar features have been numbered with common reference numerals but have been increased by 100 (i.e., 110, 120, 130, etc.). It should be appreciated that similar features are structured similarly, operate similarly, and/or have the same function unless otherwise indicated by the drawings or this specification.

For example, the catheter tube 130 may extend from a handle assembly (not shown) as described above in the first embodiment. The expandable portion 132 is provided on a distal end of the catheter tube 130 and may include a tip member 138. The catheter tube 130 may also include an inner sleeve 140 and a protective sheath (not shown), which is also described above in the first embodiment.

In the illustrated embodiment, however, the expandable portion 132 includes four struts 134A, 1348, 134C, and 134D that are respectively separated by four longitudinally extending slits 135A, 135B, 135C, and 135D. The illustrated struts 134A, 134B, 134C, and 134D each include an incising element 136, although such is not required. It should be appreciated that the expandable portion 132 may have any number or configuration of struts and incising elements as desired.

As shown in FIG. 8, the illustrated expandable portion 132 further includes recessed portions 160 that respectively extend into the outer surfaces of the struts 134A, 134B, 134C, and 134D. For example, the struts 134A, 134B, 134C, and 134D can be slightly bowed inwardly toward the inner sleeve 140 when in the closed position or, alternatively, may have a reduced thickness along a central portion thereof to create the recessed portions 160. The illustrated incising elements 136 are respectively disposed within the recessed portions 160. Thus, when the catheter tube 130 is inserted into a blood vessel, as described above, the recessed portions 160 help to prevent the incising elements 136 from coming into contact with inner walls of the blood vessel. On the other hand, when the expandable portion 132 is expanded to an opened position, as explained below, the incising elements 136 become exposed from the recessed portions 160.

It should be appreciated that the recessed portions 160 can eliminate or reduce the need for the protective sheath (not shown). The guide wire 152 may extend through the entire device.

The expandable portion 132 can be operated between a closed position (shown in FIG. 8) and an opened position (shown in FIGS. 9 and 10) by selective movement of the inner sleeve 140 relative to the catheter tube 130, as described above in the first embodiment. Alternatively (or in addition), the struts 134A, 134B, 134C, and 134D can be biased in the opened position. In such an embodiment, the protective sheath (not shown) can be used to effect movement of the expandable portion 132 between the closed position and the opened position.

Figure 11:
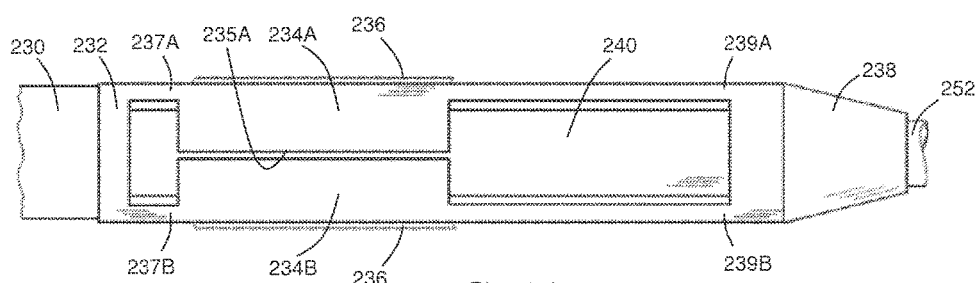
FIG. 11 is an enlarged side view of a catheter tube having an expandable incising portion, in accordance with a third embodiment of this invention.
Figure 12:
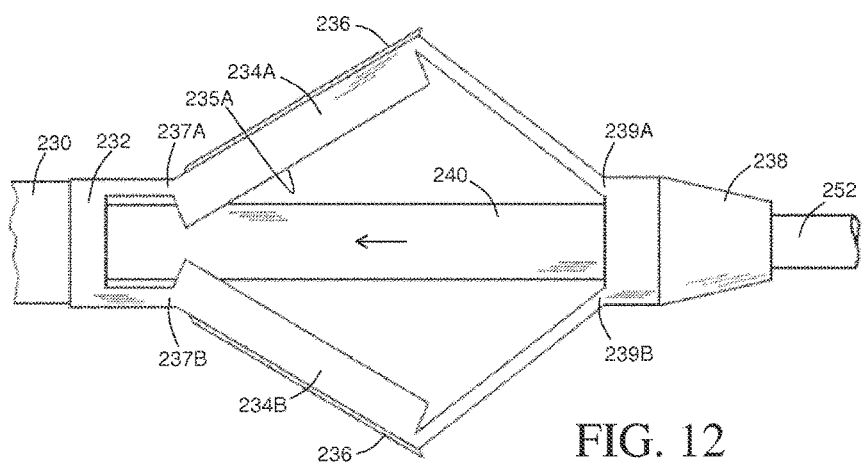
FIG. 12 is a side view of the catheter tube shown in FIG. 11 illustrating the expandable incising portion in an opened position.
Figure 13:
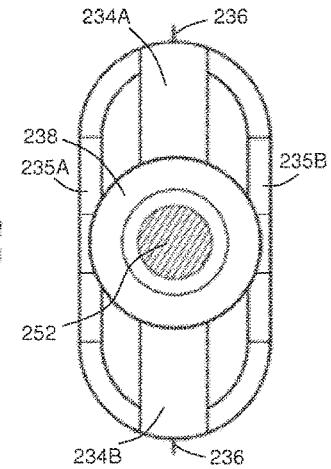
FIG. 13 is an end view of the catheter tube as shown in FIG. 12.

Referring now to FIGS. 11 through 13, there is illustrated a catheter tube 230 having an expandable portion 232, in accordance with a third embodiment of this invention. The catheter tube 230 and the expandable portion 232 may include any structural features as described and illustrated above in the previous embodiments, although such is not required. Similar features have been numbered with common reference numerals but have been increased by 200 (i.e., 210, 220, 230, etc.). It should be appreciated that similar features are structured similarly, operate similarly, and/or have the same function unless otherwise indicated by the drawings or this specification.

For example, the catheter tube 230 may extend from a handle assembly (not shown) as described above in the first embodiment. The expandable portion 232 is provided on a distal end of the catheter tube 230 and includes a pair of struts 234A and 234B that are separated by a pair of longitudinally extending slits 235A and 235B. The catheter tube 230 may also include a tip member 238, an inner sleeve 240, and a protective sheath (not shown), which is described above in the first embodiment. The guide wire 252 may extend through the entire device.

In the illustrated embodiment, however, the expandable portion 232 includes a first pair of weakened regions 237A, 237B and a second pair of weakened regions 239A, 239B that are respectively located at opposite ends of the struts 234A and 234B. The illustrated weakened regions 237A, 237B and 239A, 239B are formed by enlarged apertures that extend through side walls of the expandable portion 232 that function as hinges. The weakened regions 237A, 237B and 239A, 239B may help reduce the amount of bending stress in the side walls of the expandable portion 232 when the struts 234A and 234B are moved to an opened position. The struts 234A and 234B may include any number or configuration of weakened regions. Further, it should be appreciated that any of the other embodiments in this disclosure may also include weakened regions 237A, 237B and 239A, 239B.

The illustrated struts 234A and 234B remain generally flat along respective lengths thereof in both a closed position (shown in FIG. 11) and an opened position (shown in FIGS. 12 and 13) so as to form an apex, although such a configuration is not required. The incising elements 236 are provided along the generally flat portion of the respective struts 234A and 234B. As such, the incising elements 236 may also function as stiffening members for increasing the strength of the struts 234A and 234B. Further, this configuration can reduce the amount of stress in the connection between the incising elements 236 and the struts 234A and 234B, which may otherwise be caused by bowing of the struts 234A and 234B.

As shown in FIG. 12, end portions of the incising elements 236 may extend beyond the apex that is formed by each of the respective struts 234A and 234B. This configuration can increase the effective height of the incising elements 236 when the expandable portion 232 is in the opened position. As such, the incising elements 236 may have a reduced height when the expandable portion 232 is in the closed position, which may eliminate the need for the protective sheath (not shown).

The expandable portion 232 can be operated between the closed position and the opened position by selective movement of the inner sleeve 240 relative to the catheter tube 230, as described above in the first embodiment. Alternatively (or in addition), the struts 234A and 234B can be biased in the opened position. In such an embodiment, the protective sheath (not shown) can be used to effect movement of the expandable portion 232 between the closed position and the opened position.

Figure 14:
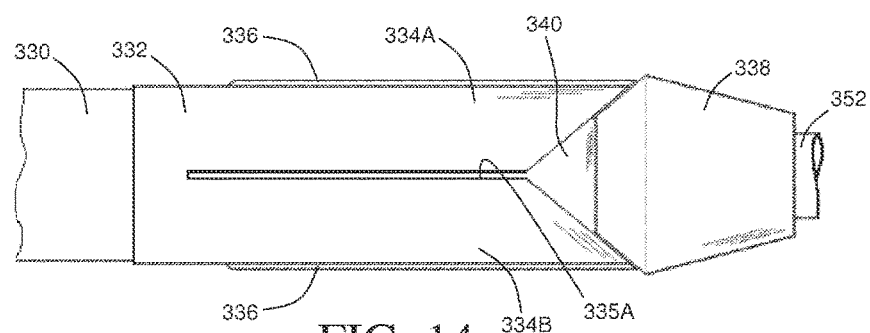
FIG. 14 is an enlarged side view of a catheter tube having an expandable incising portion, in accordance with a fourth embodiment of this invention.
Figure 15:
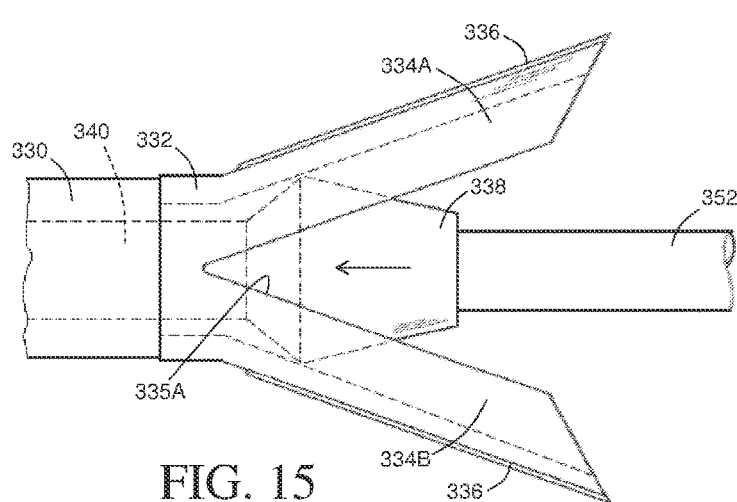
FIG. 15 is a side view of the catheter tube shown in FIG. 14 illustrating the expandable incising portion in an opened position.
Figure 16:
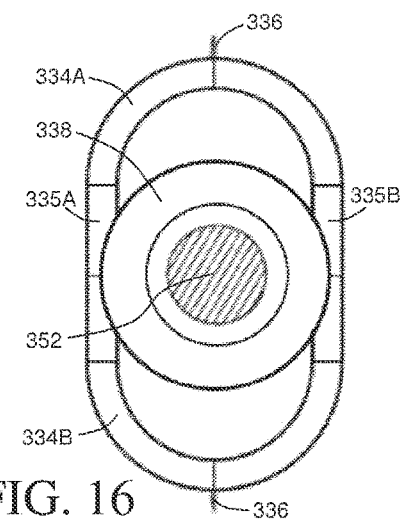
FIG. 16 is an end view of the catheter tube as shown in FIG. 15.

Referring now to FIGS. 14 through 16, there is illustrated a catheter tube 330 having an expandable portion 332, in accordance with a fourth embodiment of this invention. The catheter tube 330 and the expandable portion 332 may include any structural features as described and illustrated above in the previous embodiments, although such is not required. Similar features have been numbered with common reference numerals but have been increased by 300 (i.e., 310, 320, 330, etc.). It should be appreciated that similar features are structured similarly, operate similarly, and/or have the same function unless otherwise indicated by the drawings or this specification.

For example, the catheter tube 330 may extend from a handle assembly (not shown) as described above in the first embodiment. The expandable portion 332 is provided on a distal end of the catheter tube 330 and may include a tip member 338. The catheter tube 330 may also include an inner sleeve 340 that is attached to the tip member 338 and a protective sheath (not shown), which is also described above in the first embodiment. The guide wire 352 may extend through the entire device.

In the illustrated embodiment, however, the expandable portion 332 includes a pair of struts 334A and 334B that are supported thereon in a cantilevered manner (i.e., not attached to one another or to the tip member 338 at their distal ends), the purpose of which will be explained below. The struts 334A and 334B are separated by a pair of longitudinally extending slits 335A and 335B that extend from the end of the expandable portion 332. A pair of incising elements 336 is respectively provided along outer surfaces of the struts 334A and 334B. It should be appreciated, however, that the expandable portion 332 may have any number or configuration of struts and incising elements as desired.

As shown in FIGS. 15 and 16, the illustrated struts 334A and 334B are supported on the expandable portion 332 so that they can be splayed open in a Y-shaped configuration. For example, the struts 334A and 334B can be splayed open by drawing the inner sleeve 340 within the catheter tube 330, as described above in the first embodiment. In doing so, the tip member 338 slides along the inner surfaces of the struts 334A and 334B and pivots them outwardly. Alternatively (or in addition), the struts 334A and 334B can be biased in the splayed open position. In such an embodiment, the protective sheath (not shown) can be used to effect movement of the expandable portion 332 between a closed position and the splayed open position.

The struts 334A and 334B remain generally flat along their respective lengths in both a closed position (shown in FIG. 14) and the splayed open position, although such is not required. As such, the incising elements 336 may also function as stiffening members for increasing the strength of the struts 334A and 334B. Further, this configuration can reduce the amount of stress in the connection between the incising elements 336 and the struts 334A and 334B, which may otherwise be caused by bowing of the struts 334A and 334B.

As shown in FIG. 15, end portions of the incising elements 336 may extend beyond the distal ends of the respective struts 334A and 334B. This configuration can increase the effective height of the incising elements 336 when the expandable portion 332 is in the splayed open position. As such, the incising elements 336 may have a reduced height when the expandable portion 332 is in the closed position, which may eliminate the need for the protective sheath (not shown).

Figure 17:
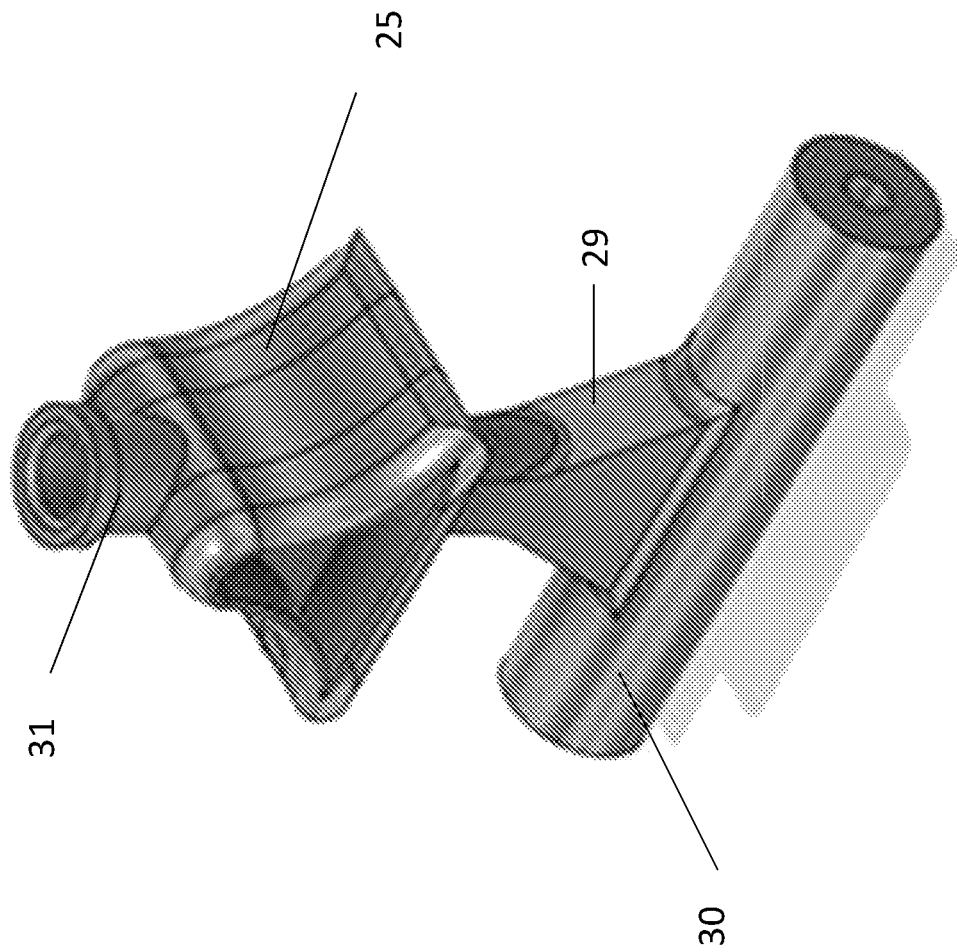
FIG. 17 is a perspective view of an exemplary portion of an exemplary handle assembly for use with the device of FIGS. 1-16.

As shown in FIG. 17, the handle assembly 20 may comprise a luer lock 31. The luer lock 31 may be integrated with the control member 25 in exemplary embodiments. The control member 25 may be connected to the catheter tube 30. Such connection may be direct or indirect, such as but not limited to, the base portion 26, an intermediate element 29, combinations thereof, or the like. The luer lock 31 may be in fluid communication with an interior of the catheter tube 30. In other exemplary embodiments, the control member 25 may be connected to, directly or indirectly, the inner sleeve 40, and fluid communication between the luer lock 31 and the inner sleeve 40 may be established. For example, without limitation, one or more of said luer lock 31, said control member 25, said intermediary members 29, and said catheter tube 30 may comprise a continuous hollow passageway configured to accommodate one or more fluids, such as but not limited to, medications, saline, carbon dioxide, combinations thereof, or the like. Said hollow passageway may extend to said expandable portion 32, struts 34, and/or incising elements 36 including, for example without limitation as shown and/or described in at least U.S. Pat. No. 10,610,255 issued Apr. 7, 2020, the disclosures of which are hereby incorporated by reference as if fully restated herein. Any type or kind of luer lock 31 or other adapter for providing fluid communication from outside the device 10 to the expandable portion 32, or components thereof, may be utilized.

Figure 18:
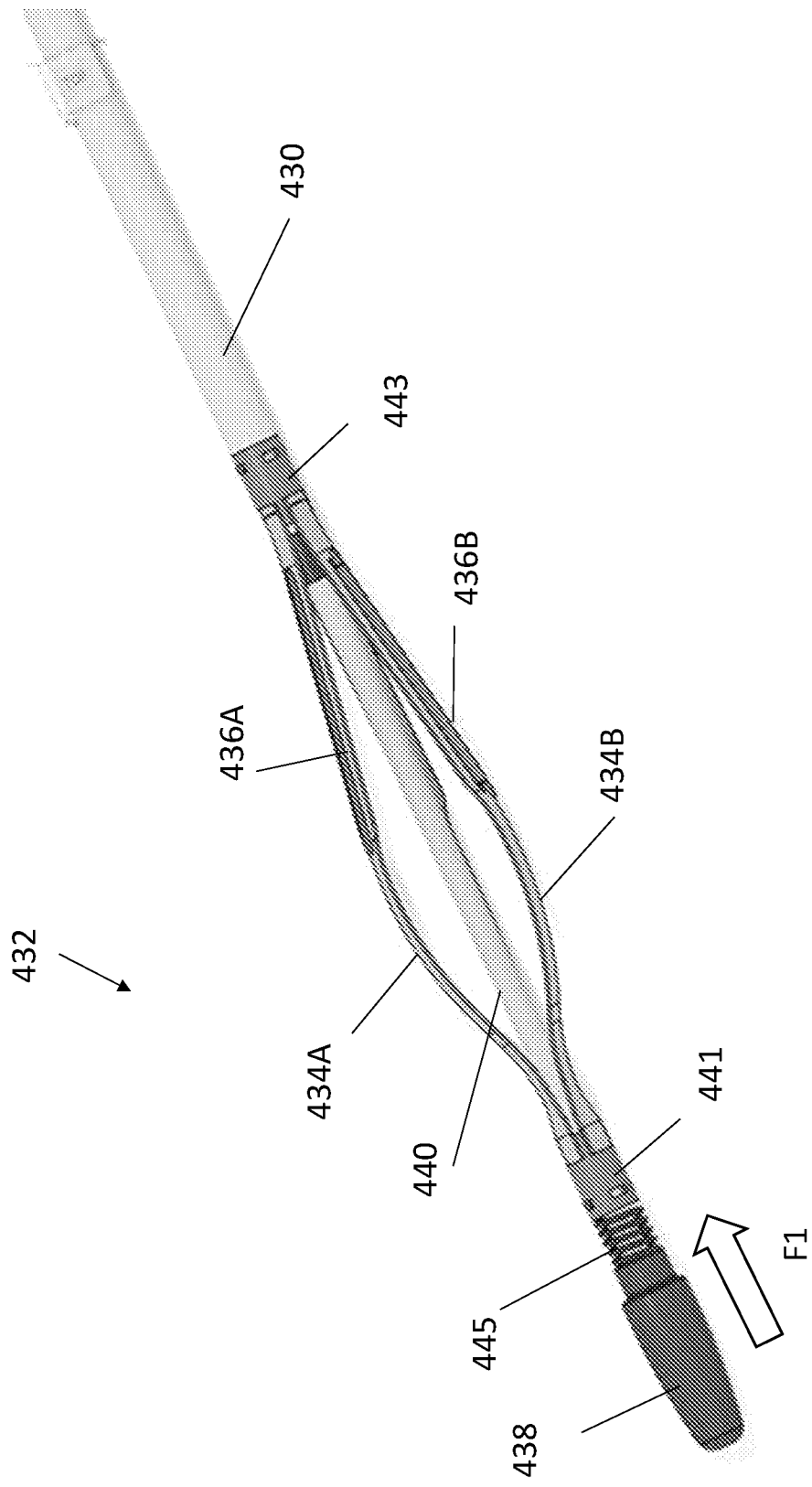
FIG. 18 is a perspective view of another exemplary embodiment of the expandable incising portion.

FIG. 18 illustrates another exemplary embodiment of the expandable portion 432. Similar features may be numbered with common reference numerals and increased by 100 (e.g., 10 to 110, 210, 310, or 410, etc.). The struts 434A, B, C may comprise one or more memory materials. The struts 434A, B, C may be biased in the expanded position in exemplary embodiments. For example, without limitation, the struts 434 may be heat set to expand to a particular size such that the expandable portion 432 reaches substantially a predetermined diameter when allowed to expand. In this way, when the sheath 42 is moved relative to the catheter tube 430 to expose the expandable portion 432, the struts 434 may be automatically moved into the expanded position. In such embodiments, the control member 25 may be connected to the catheter tube 430 so that movement of the control member 25, such as but not limited to advancement with the slot 24, may translate to advancement of the catheter tube 430 relative to the fixed sheath 42 so as to selectively expose the expandable portion 432 from the sheath 42 for movement into the opened position. Other movement of the control member 25, such as but not limited to retraction along the slot 24, may be configured to cause retraction of said catheter tube 430 relative to the fixed sheath 42 so as to selectively force the expandable portion 432 into the sheath 42 and into the unexpanded position.

An incising element 436A, B, C may be provided on some or all of the struts 434A, B, C. The incising elements 436 may extend along some or all of the respective one of the struts 434 on which the incising element 436 is installed, integrally formed with, mounted to, bonded to, or the like.

A first portion 443 of the expandable portion 432 may connect a proximal end of each of the struts 434 to one another and/or secure the proximal end of each of the struts 434 to the catheter tube 430, an inner sleeve 440, combinations thereof, or the like. A second portion 441 of the expandable portion 432 may connect a distal end of each of the struts 434 to one another and/or secure the distal end of each of the struts 434 to the catheter tube 430, an inner sleeve 440, tip member 438, combinations thereof, or the like. The first 443 and/or second 441 portions may be integrally formed with, bonded to, attached to, or otherwise form part of the expandable portion 432 or may be separate therefrom and connected to the same such as by adhesion, welding, fasteners, friction fit, press fit, combinations thereof, or the like.

A limiter 445 may be provide between the expandable portion 432 and the tip member 438. For example, without limitation, the limiter 445 may be provided between the second portion 441 and the tip member 438. The limiter 445 may be configured to cause the expandable portion 432 to expand only to a predetermined size. The limiter 445 may comprise one or more springs configured to provide sufficient forces F1 axially along said inner sleeve 440 and/or catheter tube 430 towards said handle assembly 20 to force said struts 434 to bow outwardly when said expandable portion 432 is exposed form the sheath 42 for expansion into the expanded position. In this way, the limiter 445 may act to bias the expandable portion 432 in the expanded position. Because the amount of force applied by the limiter 445 may be predetermined and/or limited, this may prevent the expandable portion 432 from expanding beyond a desired diameter. This arrangement may permit retraction of the sheath 42 beyond the expandable portion 432 without necessarily changing the size of the expandable portion 432 and/or the forces exerted by the incising member 436. This may be particularly advantageous where the otherwise tortuous nature of the vascular system and/or other characteristics of the access site may make precise control of the size of the expandable portion 432 by movement of the control member 25 difficult. This may also prevent over expansion of the expandable portion 432 and/or over exertion of forces at the incising elements 436.

Figure 19:
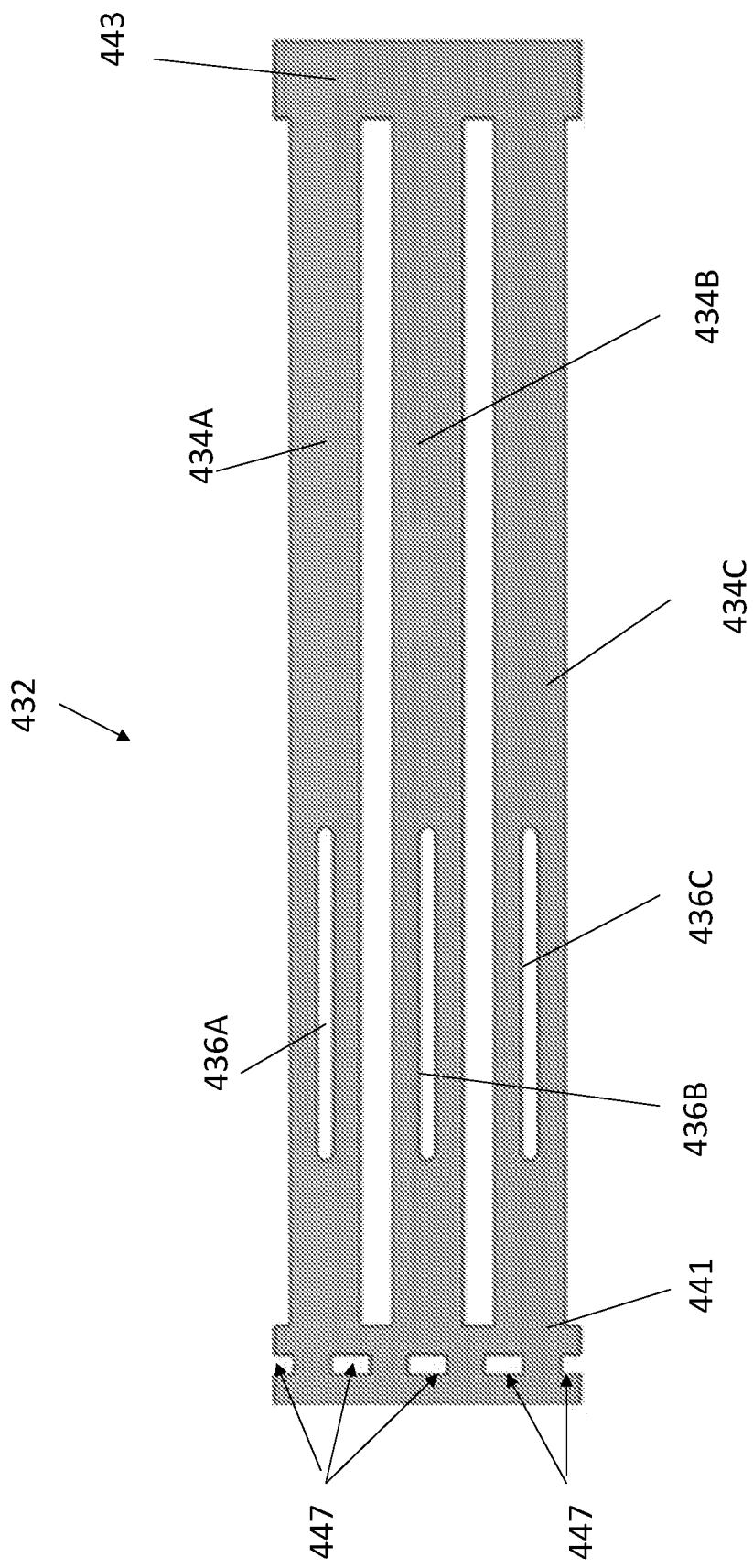
FIG. 19 is a plan view of an exemplary expandable incising portion partially assembled.

FIG. 19 illustrates a partially assembled version of the expandable portion 432. The struts 434, first portion 441, and/or second portion 443 may be formed from a common piece of material. For example, without limitation, a single piece of material, such as but not limited to, polyvinyl, polyethylene, nitinol, stainless steel, combinations thereof, or the like, may be cut or otherwise formed, then rolled, and welded to form some or all of the expandable portion 432.

In exemplary embodiments, a number of holes 447 may be formed in the second portion 441. The holes 447 may be configured for securement to corresponding portions on the catheter tube 430, the inner sleeve 440, the tip member 438, combinations thereof, or the like. Alternatively, or additionally, the holes 447 may be configured to receive portions of the limiter 445, which may also be secured to the tip member 438 and/or the inner sleeve 440. In this way, the number of welds required to create the expandable portion 432 may be reduced, such as to two welds—one on either end thereof.

The incising elements 436 may be installed on the struts 434, such as but not limited to, by adhesion, welding, press fit, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An intravascular catheter device for incising tissue located within a blood vessel, said intravascular catheter device comprising:
   a flexible catheter tube having a proximal end and a distal end;
   a sheath;
   an expandable portion secured to the distal end of the flexible catheter tube and comprising a first collar portion at a proximal end of the expandable portion, a second collar portion at a distal end of the expandable portion, and a plurality of struts, each extending longitudinally between the first collar portion and the second collar portion such that each of said first collar portion and said second collar portion interconnect each of the plurality of struts, wherein said expandable portion is configured for controllable movement between a first position where at least a portion of each of said plurality of struts is moved outward so as to extend beyond an outer surface of said sheath and a second position where at least said portion of each of said plurality of struts is moved towards one another;
   a tip member located distal to, and spaced apart from, the distal end of said expandable portion;
   a limiter interposed between the second collar portion of said expandable portion and said tip member, wherein the limiter is configured to exert a counterforce against movement of said expandable portion between said first position and said second position; and
   an incising element associated with one of the plurality of struts, wherein said incising element extends longitudinally along a longitudinal axis of the one of the plurality of struts to incise said tissue when said intravascular catheter device is placed within said blood vessel, said expandable portion is placed in said first position, and said expandable portion is retracted axially along the blood vessel.

2. The intravascular catheter device of claim 1 wherein: the expandable portion is biased in the first position.

3. The intravascular catheter device of claim 2 wherein: the sheath is configured for sliding movement relative to said expandable portion, wherein retraction of said sheath is configured to permit said expandable portion to move into said first position and extension of said sheath is configured to force said expandable portion into said second position.

4. The intravascular catheter device of claim 1 further comprising:
   an inner sleeve extending within the flexible catheter tube and interior to each of said plurality of struts, wherein said inner sleeve is connected to said tip member, wherein each of said plurality of struts extend longitudinally along a longitudinal axis of said inner sleeve when said expandable portion is in said second position.

5. The intravascular catheter device of claim 4 wherein: said limiter comprises at least one coil spring surrounding a portion of the inner sleeve.

6. The intravascular catheter device of claim 5 further comprising:
   a handle assembly; and
   a control member located at said handle assembly and connected to said flexible catheter tube, wherein a portion of said control member extends within a slot formed in a body of said handle assembly for connection to said inner sleeve such that sliding movement of said control member is configured to translate to sliding movement of said lip member relative to said expandable portion so as to move said expandable portion between said first position and said second position.

7. The intravascular catheter device of claim 6 wherein: said inner sleeve and said tip member are configured to accommodate a guide wire.

8. The intravascular catheter device of claim 6 further comprising:
   a luer lock integrated with said control member.

9. The intravascular catheter device of claim 8 further comprising:
   a medication delivery device in fluid communication with the luer lock by way of a continuous passageway, wherein said medication delivery device is associated with the one of the plurality of the struts also associated with the incising element.

10. The intravascular catheter device of claim 1 wherein: said incising element extends only along a proximal portion of said one of the plurality of struts.

11. The intravascular catheter device of claim 1 wherein: said incising element extends in a straight line along the longitudinal axis of said one of the plurality of struts.

12. The intravascular catheter device of claim 1 wherein: said incising element extends along a midline of said one of the plurality of struts; and
    said incising element extends parallel with a longitudinal axis of said expandable portion when said expandable portion is in said second position.

13. The intravascular catheter device of claim 1 formed by a process comprising the steps of:
    forming the plurality of struts in a material by cutting slots in said material defining gaps between said plurality of struts, wherein said slots do not extend a length of the material so as to provide the first collar portion at the proximal end thereof which connects a proximal end of each of said plurality of struts to one another and the second collar portion at the distal end thereof which connects a distal end of each of said plurality of struts to one another;
    rolling said material into a cylindrical shape;
    connecting said expandable portion to a distal portion of the flexible catheter tube;
    and connecting said flexible catheter tube to a control member at a handle assembly at a proximal portion of said flexible catheter sleeve, wherein said control member is configured for user actuation between a first position and a second position, wherein movement of said control member between said first and second positions is configured to move said flexible catheter tube relative to said sheath so as to move said plurality of struts between a covered position where said plurality of struts are located within said sheath, and an exposed position where said plurality of struts are exposed from said sheath for movement into an expanded position wherein at least a mid-portion of each of said plurality of struts is moved outward.

14. The intravascular catheter device formed by the process of claim 13 wherein:
the material comprises a sheet of nitinol.

15. The intravascular catheter device formed by the process of claim 13 further comprising the steps of:
attaching the incising element to the one of the plurality of struts.

16. The intravascular catheter device of claim 1 wherein:
each of the plurality of struts is directly connected to the first collar portion and the second collar portion.

17. The intravascular catheter device of claim 16 wherein:
at least the first collar portion, the second collar portion, and the plurality of struts are integrally formed.

18. A method of using the intravascular catheter device of claim 1, said method comprising:
placing the expandable portion in the second position;
while the expandable portion is in the second position, inserting the expandable portion into the blood vessel and positioning the expandable portion at an area for treatment within the blood vessel;
placing the expandable portion in the first position; and
while the expandable portion is in the first position, retracting the expandable portion along the area for treatment within the blood vessel so as to incise the tissue at the area for treatment by way of the incising element.

19. An intravascular catheter device for incising material located within a blood vessel, said intravascular catheter device comprising:
an expandable portion comprising a plurality of struts, each extending longitudinally between, and connected to, a first collar portion at a proximal end thereof and a second collar portion at a distal end thereof, wherein the first collar portion and the second collar portion interconnect the plurality of struts, wherein said plurality of struts is configured for controllable movement between a first position where at least a portion of each of said plurality of struts is moved outward and a second position where at least said portion of each of said plurality of struts is moved towards one another;
a tip member spaced apart from the second collar, said tip member forming a distal, free end of the intravascular catheter device;
a limiter interposed between the second collar portion and said tip member, wherein the limiter is configured to exert a counterforce against movement of said expandable portion between said first position and said second position; and
an incising element extending longitudinally along a longitudinal axis of one of the plurality of struts and outward therefrom.

20. The intravascular catheter device of claim 19 further comprising:
a flexible catheter tube having a proximal end and a distal end, wherein the distal end is connected to the first collar portion;
an inner sleeve extending within the flexible catheter tube, interior to each of said plurality of struts, and connected to said tip member, wherein each of said plurality of struts extend longitudinally along a longitudinal axis of said inner sleeve when in said second position, and wherein said limiter comprises a coil spring extending about a portion of the inner sleeve;
a handle assembly forming a proximal end of the intravascular catheter device, wherein the proximal end of the flexible catheter tube extends from the handle assembly;
a control member located at said handle assembly and connected to said inner sleeve; and
a sheath controllably movable over said plurality of struts.

* * * * *

UNITED STATES PATENT AND TRADEMARK OFFICE
CERTIFICATE OF CORRECTION

| | | |
|---|---|---|
| PATENT NO. | : 12,433,633 B2 | Page 1 of 1 |
| APPLICATION NO. | : 17/856435 | |
| DATED | : October 7, 2025 | |
| INVENTOR(S) | : John P. Pigott et al. | |

It is certified that error appears in the above-identified patent and that said Letters Patent is hereby corrected as shown below:

In the Specification

Column 8, Line 45, please delete "1348" and insert -- 134B --.
Column 9, Line 10, please delete "1348" and insert -- 134B --.

Signed and Sealed this
Thirteenth Day of January, 2026

John A. Squires
*Director of the United States Patent and Trademark Office*